United States Patent

[11] 3,607,026

| [72] | Inventors | Thomas S. Perrin<br>Mentor;<br>Robert G. Banner, Painesville; John O. Brandstaetter, Mentor, all of Ohio |
|---|---|---|
| [21] | Appl. No. | 817,426 |
| [22] | Filed | Apr. 18, 1969 |
| [45] | Patented | Sept. 21, 1971 |
| [73] | Assignee | Diamond Shamrock Corporation<br>Cleveland, Ohio |

[54] CONTINUOUS CHROMIC ACID PROCESS AND APPARATUS
3 Claims, 1 Drawing Fig.

[52] U.S. Cl. ........ 23/145, 23/121, 23/280
[51] Int. Cl. .......................... C01j 37/12, C01d 5/02, B01d 43/00
[50] Field of Search .......................... 23/145, 121, 280

[56] References Cited
UNITED STATES PATENTS
3,065,055  11/1962  Perrin et al. .................. 23/145
3,230,042  1/1966  Heinze et al. .................. 23/145

Primary Examiner—Oscar R Vertiz
Assistant Examiner—Hoke S. Miller
Attorneys—C. Thomas Cross, Roy Davis, Timothy E. Tinkler, Dick M. Warburton, John J. Freer, Sam E. Laub, Neal T. Levin, Leslie G. Nunn, Jr., Helen P. Brush and John C. Tierman ABSTRACT: A process and apparatus for continuously purifying bisulfate-containing crude chromic acid crystals is described in which a molten heel of bisulfate is established in a combination melter-decanter unit. Into this molten heel is introduced crude chromic acid crystals, with agitation of the heel, sufficient heat being applied to the heel to maintain same in a molten condition and accomplish conversion of the introduced crystals to the molten state. Owing to its higher density, pure molten chromic acid settles to the bottom of the unit from which it is continuously withdrawn. Excess bisulfate is likewise continuously removed from the heel. Retention times of both bisulfate and chromic acid within the melter-decanter unit are determined by the difference in height between chromic acid and bisulfate withdrawal means.

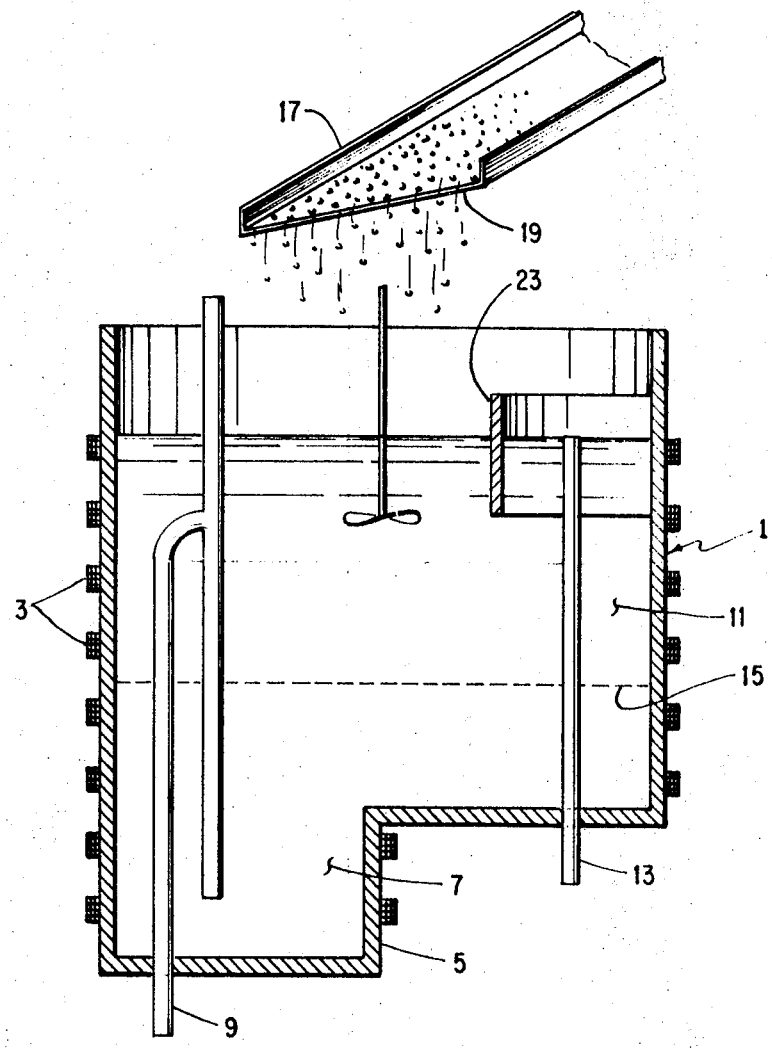

CONTINUOUS CHROMIC ACID PROCESS AND APPARATUS

BACKGROUND OF THE INVENTION

It is well know to produce chromic acid by the so-called "wet process" wherein an aqueous bichromate liquor, e.g., sodium bichromate, is reacted with an excess of sulfuric acid. In this manner crude crystals of chromic acid are forced out of the solution by the excess sulfuric acid. These crystals are then removed from the mother liquor by filtration. Since these crystals have associated therewith various impurities, especially bisulfate and sulfuric acid, they must be further purified in order to obtain a commercially desirable product. Ordinarily this is accomplished in a batch-type operation wherein the crude crystals of chromic acid are introduced into a melting vessel where, upon application of heat to raise the crystal temperature to the rather narrow range of from 390° F. to 405° F., melting takes place and, owing to the difference in density between the bisulfate and the chromic acid, the heavier chromic acid falls to the bottom of the melting vessel while the molten bisulfate remains as a layer on the top. Agitation of the melting vessel is then discontinued in order to allow the two phases to separate completely whereupon pure chromic acid is withdrawn from the lower portion of the melting vessel and transferred to flaking rolls where the product is cooled and transformed into the dry, particulate material of commerce.

In the past no method has been known which has proven commercially successful for operation of the foregoing process on a continuous rather than a batchwise basis. Batch-type operation has been necessitated by the fact that no continuous process has been advanced allowing separation of the two layers subsequent to melting, which does not also exhibit either serious decomposition of the chromic acid with a resultant increase in the insolubles content, poor separation of the bisulfate and chromic acid layers with a consequent high sulfate content in the final product, or both.

The main problem with prior art batch-type processes, as well as attempted continuous processes, has lain in the difficulty in controlling the heat required to initially melt the crude crystals and that required to maintain molten state during the separation of the two layers. On the one hand, when bringing the crystals to melting temperature, the tendency is to overshoot the required temperature range of 390°–405°F. since heat transfer between the melting vessel and the crude crystals is quite poor. Consequently this has resulted in "-burning" of a portion of the product with a resultant poor color and high insolubles content. Furthermore, because of the difficulty in maintaining the required temperature in the melt while separation takes place, a relatively short retention time was necessitated, to avoid further decomposition, with a resultant high sulfate content in the chromic acid owing to incomplete separation of the layers. Hence prior practice has been to limit the retention time to the minimum consistent with acceptable separation and to exercise extreme care in bringing the batch to original temperature.

Obviously, an efficient continuous process would be significantly more economical to practice. For example, in a batch-type process it is necessary for the operator of the flaking roll to control a varying flow of chromic acid in order to result in an even feed to the flaking roll. In a continuous process the flow would be of an even and constant nature thereby actually resulting in an increase in the amount of chromic acid that could be processed on a flaking roll per day. Likewise, it is often the practice to add the waste bisulfate to a steam of sodium chromate liquor in order to absorb the acidity of the bisulfate and prevent its solidification, thereby simplifying waste disposal procedures. Again, an uneven flow of bisulfate to the chromate stream is difficult to control whereas an even, continuous flow could readily be handled automatically. Other advantages are inherent in a continuous process such as the savings realized in time and manpower requirements and improved industrial hygiene. If this continuous process also provided a significantly improved temperature control during operation with a resultant increase in chromic acid purity, the advantages would be even more pronounced.

STATEMENT OF THE INVENTION

Therefore it is an object of this invention to provide a process and apparatus for the continuous production of pure chromic acid.

It is a further object of this invention to provide a continuous process for the production of chromic acid from crude chromic acid crystals, which process features improved temperature control.

A still further object of this invention is to provide a continuous process for producing chromic acid employing one vessel as a combination melter-decanter.

These and other advantages and objects of the present invention will become apparent to those skilled in the art from the specification and claims which follow.

It has now been found that chromic acid having a high degree of purity may be produced in a continuous manner by a process which comprises: (a) establishing a molten bisulfate heel in a melter-decanter unit; (b) continuously introducing crude chromic acid crystals, or the reactants for forming said crystals, into said bisulfate heel; (c) agitating said heel and applying sufficient heat to maintain the bisulfate heel in a molten state and to melt the added chromic acid crystals; (d) allowing the molten chromic acid to settle to the bottom of the melter-decanter; and, (e) continuously withdrawing purified chromic acid from the bottom and waste bisulfate from the upper portion of the melter-decanter. In this manner and by controlling the rate of addition of materials, e.g., crystals, to the heel it is possible to accurately and easily control the temperature of both the bisulfate and chromic acid layers and thereby allow maximum separation of the layers.

DESCRIPTION OF THE DRAWING

The attached drawing illustrates a typical melter-decanter and certain supporting apparatus useful in the practice of the present invention.

DESCRIPTION OF THE PREFERRED EMBODIMENTS

Previously it had been thought that increased residence time in a chromic acid melter resulted in a corresponding increase in the insolubles content of the final product. For this reason it has been the general practice to allow the bisulfate and chromic acid layers to separate for only a few minutes after completion of the melting step. This, of course, has in many instances led to incomplete separation and, consequently, to undesirably high sulfate levels in the final product as well as to waste in that a portion of chromic acid remains in the bisulfate layer. The thermal decomposition of the chromic acid, which leads to increased insolubles, has been found to be largely due to two factors. First, and perhaps foremost, chromic acid decomposition occurs during the melting portion of the process owing mainly to the poor heat transfer between the melter walls and the crude crystals. Generally, in order to melt the crystals in a reasonable period of time, the walls are heated to temperatures on the order of 500°–600° F., which is well in excess of the desired melt temperature range of 390°–405° F. Therefore, when melting finally does occur, this excess available heat causes the melt temperature to exceed the 405° F. maximum, at least in the vicinity of the melter walls, thus resulting in a "burned" product. Even after melting takes place however, additional decomposition often occurs since there is no way to control the melt temperature other than by changing the melter wall temperature and again the heat transfer properties of the new quiescent molten body of material are quite poor.

The present invention, however, overcomes these problems and, because of improved heat control and heat transfer and the continuous nature of the process, allows retention times for both the bisulfate and chromic acid layers to be increased thereby resulting in good separation without an increase in insolubles content or a sacrifice in production rate. In fact, in most instances both production rate and insolubles and sulfate contents improve over a comparable batch-type operation. For example, in comparison to a continuous melter-decanter according to the present invention of a size capable of producing 20-25 tons per day of chromic acid, a batch-type operation using a vessel of the same size would be capable of producing only 4-5 tons per day of chromic acid.

In the preferred operation of the present invention the crude crystals of chromic acid, which have been formed in a separate vessel by the reaction of sulfuric acid and bichromate, are introduced into a combination melter-decanter which contains an established chromic acid-bisulfate melt. Melting of the crude crystals takes place in the bisulfate layer, or heel, and, because of the improved heat transfer between the liquid bisulfate and the crude crystals (as compared to a melter wall and crude crystals) melting is rapid and free of burning. Furthermore, since molten chromic acid and bisulfate are being continuously withdrawn and crude crystals are being continuously added, heat control of the molten layers is much more exact and effective. In other words an equilibrium is rapidly established and readily maintained between the heat applied to the walls of the melter-decanter and the cooling effect of the added crude crystals and no surges in temperature are evidenced as in a batch-type process. Furthermore, because of the constant addition and removal of material from the vessel, localized hot spots in the chromic acid layer are prevented without, surprisingly, a sacrifice in bisulfate separation. Thus retention times for the chromic acid layer of 30 minutes to one hour are practical according to this invention while still obtaining at least equal, and generally improved, insolubles contents. By way of comparison, batch-type processes require on the order of 60 -80 minutes per cycle but up to 50 -70 minutes of this time is required to reach the molten state, thus leaving only 5-10 minutes for layer separation.

As an alternative to the addition to the bisulfate heel of crude crystals of chromic acid formed in a separate vessel, it is also possible to add unreacted sulfuric acid and alkali metal bichromate directly to the melter-decanter, which thereby also serves as a reactor. In this manner, chromic acid and sodium bisulfate are formed in situ in the bisulfate heel whereupon they are separated in much the same manner as is set forth in the preceding paragraph. Since some heat is generated by the reaction between the sulfuric acid and the bichromate, the amount of heat that must be supplied to the bisulfate heel from outside sources will in most instances be lessened. In this method of operation, a larger quantity of bisulfate will have to be handled since there is no preliminary separation of waste product from the crystals.

A typical combination melter-decanter for use in the process of the present invention consists in general of a cylindrical vessel containing a chromic acid exit tube and a bisulfate overflow tube. The attached drawing illustrates a specific and preferred design of a melter-decanter unit and certain supporting equipment. It comprises a vessel 1 constructed of a ferrous metal such as stainless steel. The vessel is equipped with means for applying heat to the contents, such as a series of strip heaters 3. Alternately, inductive heating coils, gas or oil flames or a heat transfer medium may be used. In this embodiment the vessel is provided with a well 5 which increased the depth of the chromic acid layer 7 thereby resulting in increased retention time and improved separation. Extending from the well 5 is a Y-shaped chromic acid exit tube 9 one arm of which extends through the bottom of the well in the vessel, the other extending to a point just above the bottom of the well and which is vertically adjustable in order to allow for changes in operation. In communication with the bisulfate layer 11 is the bisulfate overflow tube 13 which is likewise vertically adjustable. The interface 15 between the chromic acid and bisulfate layers is also indicated. The feed chute 17, used when the feed material is crude crystals, is usually a vibratory through the end of which is cut at an angle 19 in order to more evenly distribute the crude chromic acid crystals over the surface of the bisulfate layer 11. An agitator 21 is also provided in order to disperse the crude chromic acid crystals into the bisulfate heel wherein they are melted. In order to prevent the overflow of a portion of the chromic acid crystals, which tend to float on the bisulfate layer owing to surface tension, into the bisulfate overflow tube 13, a baffle 23 is provided. Other melter-decanter designs will be apparent to those skilled in the art.

In practice according to the process of the present invention, a heel of bisulfate must be first provided in the melter-decanter and this is most readily accomplished by introducing into the melter-decanter a quantity of sulfuric acid followed by the addition of bichromate crystals. This is done after the lower portion of the melter-decanter has been brought to a temperature of approximately 400° F. and thereafter the heating is controlled to maintain the resultant heel in a molten state. Agitation is immediately commenced and, once the sulfuric acid-bichromate mixture has reacted and melted, the addition of crude crystals of chromic acid, or of sulfuric acid and bichromate, may be begun. When chromic acid begins to flow from the chromic acid exit tube and bisulfate from the bisulfate overflow tube, the system is in equilibrium and the bisulfate-chromic acid interface has been established. Once this interface has been established it will remain at a relatively constant level throughout the operation of the process regardless of minor variations in feed rate or constitution. It is this feature of the process which provides for essentially carefree continuous operation. Since the level of this interface above the bottom of the melter-decanter controls the chromic acid and bisulfate retention times, it is obvious that control of this level controls the basic operation of the process. The level of this interface is determined by the relative heights of the bisulfate overflow and chromic acid exit tubes and the densities of the bisulfate and chromic acid layers and may be determined when it is known that: the height of the chromic acid in the chromic acid exit tube above the interface $x$ the density of the chromic acid$=$ the height of the bisulfate in the bisulfate overflow tube above the interface $x$ the density of the bisulfate. Obviously even relatively small changes in this interface level will result in significant changes in retention time, hence lending flexibility to the process. The feed of crude crystals or reactants to the bisulfate heel and the application of heat to the walls of the melter-decanter are then regulated to maintain the bisulfate layer temperature between 390° F. and 400° F. A chromic acid layer temperature of about 400° F. will follow.

It should be understood, of course, that when speaking of a "bisulfate layer," in fact a certain amount of chromic acid remains dispersed in the bisulfate layer even at long retention times. The quantities involved, however, are relatively insignificant and certainly are as little or less than with typical batch processes.

In order that those skilled in the art may more readily understand the present invention, the following illustrative example is afforded.

EXAMPLE

The melter-decanter unit used in this example is similar in design to that shown in the drawing, is constructed of stainless steel and has a diameter of 30 inches and an overall height, including a 12-inch by 12-inch well, of 62 inches. In addition, for the purpose of this example, the melter-decanter is provided with a sealed intercylinder 24 inches in diameter and 31 inches high which serves to lessen the total capacity of the melter-decanter. The bisulfate overflow tube is 2 inches in diameter and extends to a height of 30 inches from the bottom of the melter-decanter. The chromic acid exit tube extends to an overflow height of 24.5 inches above the bottom of the melter-decanter well and is 1 inch in diameter. The melter-decanter is fitted with a sweep-type blade agitator which revolves at between 35 and 40 r.p.m.

After bringing the melter-decanter to temperature, 400 pounds of sodium bichromate crystals and about 275 pounds of 93 percent sulfuric acid are introduced. By this means a bisulfate layer having a temperature of 395° F. and a chromic acid layer having a temperature of 400° F. is established. Crude chromic acid crystals containing approximately 75 percent by weight chromic acid are then introduced into the melter-decanter by means of a vibratory feeder at an average rate of about 700 pounds per hour. The process is then run for in excess of 12 hours with a chromic acid retention time of 45 minutes and a retention time for the bisulfate of 2.5 hours. Results appear in the following table.

TABLE

|  | Time | | | | | | | |
|---|---|---|---|---|---|---|---|---|
|  | P.M. | | | | | | | A.M. |
|  | 1:10 | 2:15 | 3:15 | 4:20 | 5:15 | 6:45 | 9:30 | 12:30 |
| $SO_4$=percent | 0.06 | 0.06 | 0.08 | 0.05 | 0.09 | 0.08 | 0.06 | 0.06 |
| Insolubles [1] | 10.0 | 9.8 | 13.5 | 9.0 | 9.8 | 10.9 | 10.3 | 8.5 |
| Rate of $CrO_3$ production pounds minute | 7.0 | 9.0 |  | 7.0 | 9.0 | 11.0 |  | 10.0 |

[1] The values referred to are electrophotometer readings. A commercial production sample of $CrO_3$ made by a batch-type process has a reading of 15.5 and an analysis of 0.0425% insolubles.

It is readily apparent from the foregoing table that excellent results are obtained. Insolubles are consistently lower than in the commercial sample. The sulfate values also compare favorably with the commercial $CrO_3$, which has an analysis of 0.09 percent sulfate and an average production rate of 6.36 tons per day of chromic acid is obtained.

Although this invention has been described with reference to a specific embodiment thereof, it is not to be so limited since changes and alterations may be made therein which are within the full and intended scope of the appended claims.

We claim:

1. A process for continuously purifying bisulfate-containing crude chromic acid crystals, which process consists essentially of:
   a. establishing a molten bisulfate heel in a melter-decanter unit,
   b. continuously introducing crude chromic acid crystals into said bisulfate heel,
   c. agitating said heel and applying sufficient heat to maintain the bisulfate heel in a molten state and melt the added chromic acid crystals,
   d. allowing the molten chromic acid to settle to the bottom of the melter-decanter while maintaining said bisulfate heel in an agitated state and
   e. continuously withdrawing purified molten chromic acid from the bottom and waste bisulfate from the upper portion of the melter-decanter.

2. A process as in claim 1 wherein the molten chromic acid and bisulfate are continuously withdrawn through separate tubes and the amounts of time for which the chromic acid and bisulfate are retained in the melter-decanter unit are determined by the relative heights above the bottom of the melter-decanter of the inlets of said tubes.

3. An apparatus for use as a combination melter and decanter in the continuous purification of bisulfate-containing crude chromic acid which comprises:
   a. a cylindrical vessel;
   b. means associated with said vessel for applying heat to the walls thereof;
   c. a Y-shaped chromic acid exit tube, one arm of which extends through the bottom of the vessel, the other extending to a point just above the bottom of the vessel;
   d. a bisulfate overflow tube;
   e. a baffle associated with the bisulfate overflow tube to prevent the access of particulate matter thereto;
   f. means for agitating the upper portion of the contents of the vessel; and,
   g. means for feeding crude chromic acid crystals to the vessel.